US009576176B2

(12) United States Patent
Gozzini et al.

(10) Patent No.: US 9,576,176 B2
(45) Date of Patent: Feb. 21, 2017

(54) NOISE COMPENSATION IN A BIOMETRIC SENSING DEVICE

(71) Applicant: Apple Inc., Cupertino, CA (US)

(72) Inventors: Giovanni Gozzini, Cupertino, CA (US); Benjamin B. Lyon, San Jose, CA (US); William M. Vieta, Santa Clara, CA (US); Pavel Mrazek, Prague (CZ)

(73) Assignee: Apple Inc., Cupertino, CA (US)

( * ) Notice: Subject to any disclaimer, the term of this patent is extended or adjusted under 35 U.S.C. 154(b) by 702 days.

(21) Appl. No.: 13/947,572

(22) Filed: Jul. 22, 2013

(65) Prior Publication Data

US 2015/0022670 A1    Jan. 22, 2015

(51) Int. Cl.
*G06K 9/00* (2006.01)
*H04N 5/365* (2011.01)

(52) U.S. Cl.
CPC ............. *G06K 9/0002* (2013.01); *H04N 5/365* (2013.01)

(58) Field of Classification Search
CPC .............................. G06K 9/0002; H04N 5/365
See application file for complete search history.

(56) References Cited

U.S. PATENT DOCUMENTS

| | | | |
|---|---|---|---|
| 6,330,345 B1 | 12/2001 | Russo et al. | |
| 6,556,935 B2 * | 4/2003 | Morimura | G06K 9/0002 702/100 |
| 6,766,040 B1 | 7/2004 | Catalano et al. | |
| 6,990,219 B2 | 1/2006 | Morimura et al. | |
| 7,072,523 B2 | 7/2006 | Bolle et al. | |
| 7,102,673 B2 | 9/2006 | Kimura | |
| 7,813,534 B2 | 10/2010 | Ryhanen et al. | |
| 7,965,874 B2 | 6/2011 | Abiko et al. | |
| 8,098,906 B2 | 1/2012 | Shuckers et al. | |
| 8,622,302 B2 | 1/2014 | Olmstead | |
| 8,654,571 B2 | 2/2014 | John et al. | |
| 9,195,879 B1 | 11/2015 | Du | |
| 2005/0069181 A1 * | 3/2005 | Setlak | G06K 9/00013 382/124 |
| 2009/0274343 A1 | 11/2009 | Clarke | |
| 2010/0174914 A1 | 7/2010 | Shafir | |
| 2012/0300992 A1 | 11/2012 | Ivanov et al. | |
| 2013/0315451 A1 | 11/2013 | Franza | |
| 2015/0023571 A1 | 1/2015 | Gozzini et al. | |
| 2015/0071502 A1 | 3/2015 | Breznicky | |

OTHER PUBLICATIONS

U.S. Appl. No. 13/948,097, filed Jul. 22, 2013, Gozzini et al.
U.S. Appl. No. 14/020,886, filed Sep. 8, 2013, Breznicky.
Third Party Submission Under 37 C.F.R. 1.290 dated Jul. 20, 2015, U.S. Appl. No. 13/947,572, 12 pages.

* cited by examiner

*Primary Examiner* — Latanya Bibbins
(74) *Attorney, Agent, or Firm* — Brownstein Hyatt Farber Schreck, LLP

(57) ABSTRACT

An electronic device includes a biometric sensing device connected to a processing channel that includes at least one amplifier having a gain. One or more processing devices is operatively connected to the biometric sensing device and adapted to compensate for signal fixed pattern noise in signals received from the processing channel. The signal fixed pattern noise can include signal measurement variation noise and gain variation noise. The biometric sensing device captures a new image or data, and at least one processing device compensates for the signal fixed pattern noise in the newly captured image or data.

20 Claims, 13 Drawing Sheets

NOISE COMPENSATION IN A BIOMETRIC SENSING DEVICE

TECHNICAL FIELD

The present invention relates to electronic devices, and more particularly to compensating for noise in a biometric sensing device.

BACKGROUND

Biometric sensing devices are increasingly common in computer or network security applications, financial applications, surveillance applications, and system access control applications. Biometric sensing devices detect or image a unique physical or behavioral trait of a person, providing biometric data that can reliably identify the person. For example, a fingerprint includes a unique pattern of ridges and valleys that can be imaged by a fingerprint sensor. The image of the fingerprint, or the unique characteristics of the fingerprint, is compared to previously captured reference data, such as a reference fingerprint image. The identity of the person is obtained or verified when the newly captured fingerprint image matches the reference fingerprint image.

Devices that image fingerprints or other biometric data can be subject to noise and other errors. One type of noise is signal fixed pattern noise, a noise that is proportional to the signal produced by the sensors in the biometric sensing device. The signal fixed pattern noise can include two components, namely noise that is produced by variations in signal measurements between the sensors in a biometric sensing device and noise caused by variations in gain stages connected to the sensors in a biometric sensing device. Signal fixed pattern noise can be several orders of magnitude larger than the feature signal or the signal of interest. Signal fixed pattern noise can reduce the dynamic range of the biometric sensing device and produce imprecise or indefinite images or data.

SUMMARY

In one aspect, an electronic device can include a biometric sensing device comprising sensors connected to a processing channel that includes at least one amplifier. An image captured by the biometric sensing device is processed by the processing channel. One or more processing devices are operatively connected to the processing channel and adapted to compensate for signal fixed pattern noise in the captured image. The signal fixed pattern noise can include signal measurement variation noise and gain variation noise. The newly captured image can first be compensated for the signal measurement variation noise to produce a first compensated image. The first compensated image can then be compensated for the gain variation noise.

In another aspect, the one or more processing devices can be adapted to compensate for signal fixed pattern noise in an image captured by the biometric sensing device by receiving one or more signal measurement calibration images from sensors in the biometric sensing device, reconstructing voltages on the sensors based on the signal measurement calibration image to produce signal measurement calibration sensor voltages, and removing the signal measurement calibration sensor voltages from the captured image to produce a first set of compensated voltages. When multiple signal measurement calibration images are used, different images (e.g., different image content) and/or images captured with different sensor settings can be used.

In another aspect, the one or more processing devices can be adapted to compensate for signal fixed pattern noise in an image captured by the biometric sensing device by receiving one or more gain calibration images from sensors in the biometric sensing device, reconstructing voltages on the sensors based on the gain calibration image to produce gain calibration sensor voltages, and removing the gain calibration sensor voltages from the first set of compensated voltages to produce a second set of compensated voltages. When multiple gain calibration images are used, different images (e.g., different image content) and/or images captured with different sensor settings can be used.

In another aspect, the one or more processing devices can be adapted to compensate for signal fixed pattern noise in an image captured by the biometric sensing device by receiving one or more gain calibration images from sensors in the biometric sensing device, reconstructing voltages on the sensors based on the gain calibration image to produce gain calibration sensor voltages, and removing the gain calibration sensor voltages from the captured image to produce a set of compensated voltages.

In another aspect, the electronic device can include one or more temperature sensors. A temperature of the biometric sensing device can be used to adjust the compensation when the new image is compensated for signal fixed pattern noise.

In another aspect, the electronic device can include one or more storage devices for storing at least one of a test image, first calibration data for the signal measurement variation noise, and second calibration data for the gain variation noise.

In another aspect, a method for compensating for signal fixed pattern noise in an image captured by a biometric device can include receiving the captured image and removing signal measurement variation noise in the image to produce a first compensated image. The gain variation noise is then removed in the first compensated image to produce a second compensated image. The second compensated image is further processed in some embodiments. Examples of techniques that can be performed to process the second compensated image include, but are not limited to, image debluring, extraction of the features of the fingerprint, and matching the captured fingerprint image (or extracted features) with a reference image or reference features.

In another aspect, a method for compensating for signal fixed pattern noise in an image captured by a biometric device can include receiving one or more signal measurement calibration images from sensors in the biometric sensing device based on an application of a test image to the sensors and reconstructing voltages on the sensors based on the signal measurement calibration image to produce signal measurement calibration sensor voltages. The signal measurement calibration sensor voltages can be removed from the captured image to produce a first set of compensated voltages.

In another aspect, one or more gain calibration images from sensors in the biometric sensing device based on an application of a fixed voltage to the sensors can be received. The voltages on the sensors can be reconstructed based on the gain calibration image to produce gain calibration sensor voltages. The gain calibration sensor voltages from the first set of compensated voltages to produce a second set of compensated voltages.

In another aspect, compensating for gain variation noise can be performed without any gain calibration images or gain calibration sensor voltages. Instead, the compensation can be performed using known information about the sensors and the signal. For example, the known geometry of sensor-to-channel assignment combined with the assumption that the signal to be reconstructed should be substantially smooth or continuous can be used to perform gain variation noise compensation.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Figure 1:
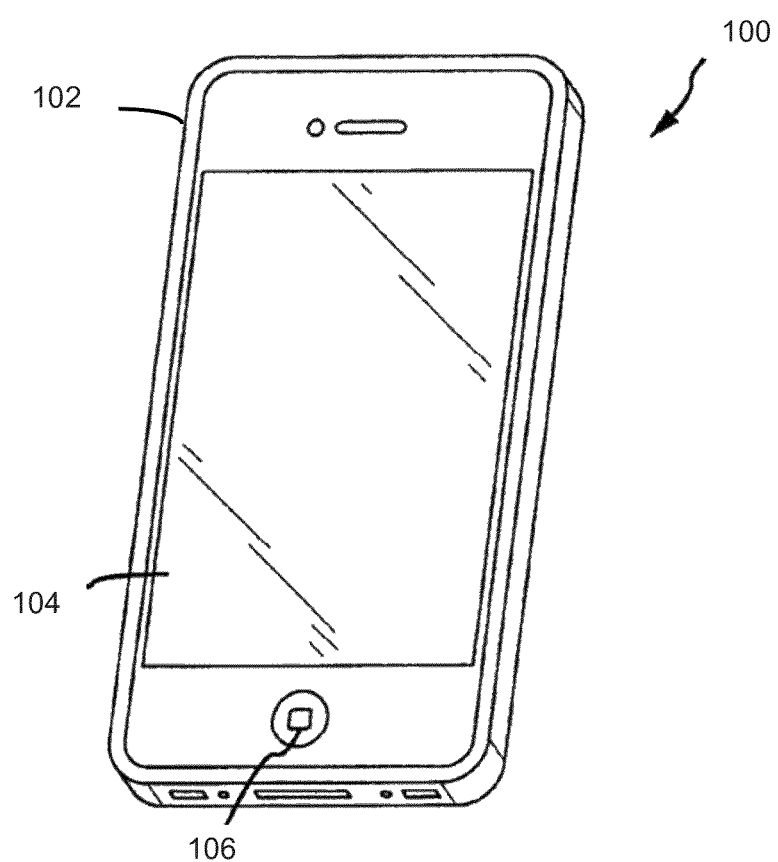
FIG. 1 illustrates a front perspective view of an example electronic device that can include one or more fingerprint capacitive sensing devices.

Generally, embodiments described herein may take the form of a biometric sensing device that compensate for two components of signal fixed pattern noise. One component is noise produced by variations in signal measurements between the sensors in a biometric sensing device ("signal measurement variation noise"). The second component is noise caused by variations in gain stages connected to the sensors in a biometric sensing device ("gain variation noise"). In some embodiments, the noise compensation can be performed in two steps by first compensating for the signal measurement variation noise to produce a first compensated image, and then compensating for the gain variation noise using the first compensated image to produce a second compensated image. Initially, calibration data for the signal measurement variation noise and the gain variation noise can be obtained and stored in the biometric device, or in an electronic device that includes, or is connected to the biometric device. The signal measurement calibration data and the gain calibration data can then be used to compensate for the two noise components when a new image or data is captured.

Compensating for the two noise components can be performed using various techniques disclosed herein. For example, in one embodiment, both the signal measurement calibration data and the gain calibration data can be fitted and removed from the captured image using a fitting process (e.g., least squares quadratic or LSQ). In another embodiment, the signal measurement calibration data can be scaled and removed from the captured image while the gain calibration data is fitted and removed from the first compensated image. The signal measurement variation data can be scaled by a ratio of the signal in the captured image over the signal in a calibration image used to obtain the signal measurement calibration data.

In other embodiments, the signal measurement calibration data can be adjusted by removing scaled gain calibration data from the signal measurement calibration data. The gain calibration data can be scaled by a ratio of a signal level in the signal measurement calibration image over the signal in the gain calibration image. The signal measurement calibration image and the gain calibration images are images produced when obtaining the respective calibration data. The adjusted signal measurement calibration data can then be used in one of several ways. For example, the adjusted signal measurement calibration data can be scaled and removed from the captured image while the gain calibration data is fitted and removed from the first compensated image using a LSQ fitting process. As before, the signal measurement variation data can be scaled by a ratio of the signal in the captured image over the signal in the calibration data.

Another method scales and removes the adjusted signal measurement calibration data from the captured image and scales and removes the gain calibration data from the first compensated image. The signal measurement calibration data can be scaled by a ratio of the signal in the captured image over the signal in the calibration image. The gain calibration data can be scaled for a known temperature. Alternatively, in yet another method, the signal measurement calibration data can be scaled by a ratio of the signal in the captured image over the signal in the signal measurement calibration image, and the gain calibration data can be scaled using dynamic calibration data determined at the same time, or close in time to when a new image is captured.

The signal measurement calibration data and the gain calibration data can be obtained when a biometric device is manufactured, or when an electronic device that includes, or is connected to a biometric sensing device is manufactured. The signal measurement calibration data can be obtained by using an external probe to apply one or more test images to the sensors in the biometric device. One or more signal measurement calibration images is obtained and stored. The gain variation calibration data can be obtained by applying one or more fixed voltages to the sensors in the biometric device. Another external probe can be used to apply the fixed voltage to the sensors. One or more gain calibration images is then obtained and stored. When multiple signal measurement calibration images and/or multiple gain calibration images are used, different images (e.g., different image content) and/or images captured with different sensor settings can be used.

Embodiments herein are described with reference to a capacitive fingerprint sensor. Other embodiments are not limited to this construction. Different types of sensing technologies that are subject to signal measurement variation noise and/or gain variation noise can be used. For example, ultrasonic, thermal, optical, resistance, and piezo-electric technologies can be used. Additionally or alternatively, other embodiments can detect or image different physical or behavioral characteristics. A person's fingerprint, eye, DNA, gait, typing speed or patterns, voice, and heart or brain signals are examples of a physical characteristic or behavioral trait that can be detected or imaged by a biometric sensing device.

Referring now to FIG. 1, there is shown a front perspective view of one example of an electronic device that can include one or more capacitive fingerprint sensing devices. As shown in FIG. 1, the electronic device 100 can be a smart telephone that includes an enclosure 102 surrounding a display 104, and one or more buttons or input devices 106. The enclosure 102 can form an outer surface or partial outer surface and protective case for the internal components of the electronic device 100, and may at least partially surround the display 104 and the input device 106. The enclosure 102 can be formed of one or more components operably connected together, such as a front piece and a back piece.

The display 104 is configured to display a visual output for the electronic device 100. The display 104 can be implemented with any suitable display, including, but not limited to, a multi-touch touchscreen that can detect position or touch inputs. The display can include any suitable type of display technology, including, but not limited to, liquid crystal display (LCD) technology, organic light-emitting display (OLED) technology, or organic electro luminescence (OEL) technology.

The input device 106 can take the form of a home button, which may be a mechanical button, a soft button (e.g., a button that does not physically move but still accepts inputs), an icon or image on a display, and so on. Further, in some embodiments, the input device 106 can be integrated as part of a cover glass of the electronic device.

Figure 2:
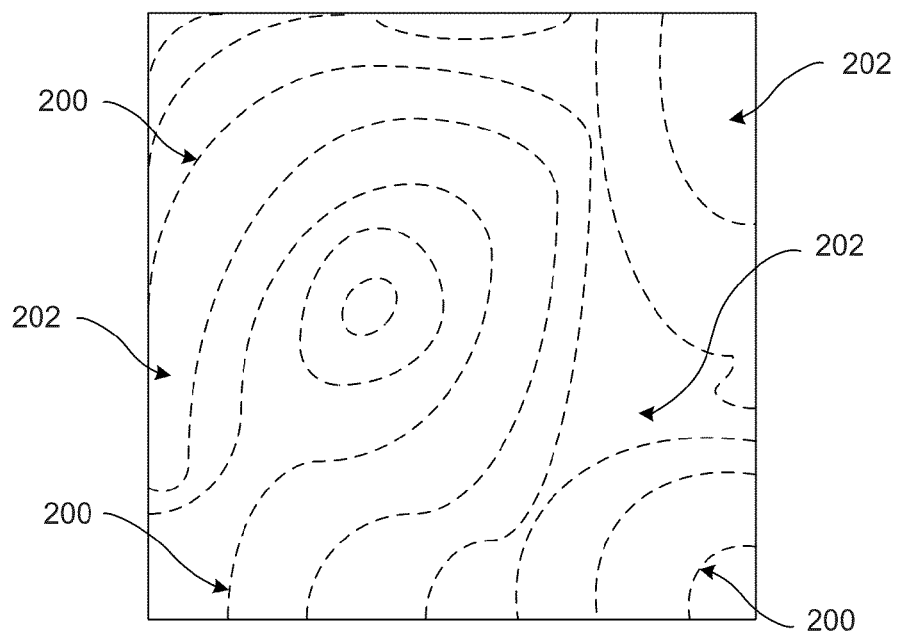
FIG. 2 is a graphic illustration of a portion of a fingerprint image.

In the embodiment illustrated in FIG. 1, a fingerprint capacitive sensing device may be incorporated into the display 104, the input device 106, or both the display 104 and the input device 106. A fingerprint includes ridges and valleys arranged in a unique pattern. FIG. 2 is a graphic illustration of a portion of a fingerprint image. The ridges 200 are represented with dashed lines. The valleys 202 are located in the areas between the ridges 200. Typically, the capacitance measured between a ridge 200 varies from the capacitance measured between a valley 202. The measured capacitance between a ridge and an electrode can be greater than the measured capacitance between a valley and an electrode because the ridge is closer to the electrode. The differences in the measured capacitances can be used to distinguish between ridges and valleys. As used herein, the term "image" or "fingerprint image" includes an image and other types of data that can be captured by a biometric sensing device. By way of example only, a biometric sensing device can produce a data structure that defines the features in a fingerprint or another type of biometric data.

Figure 3A:
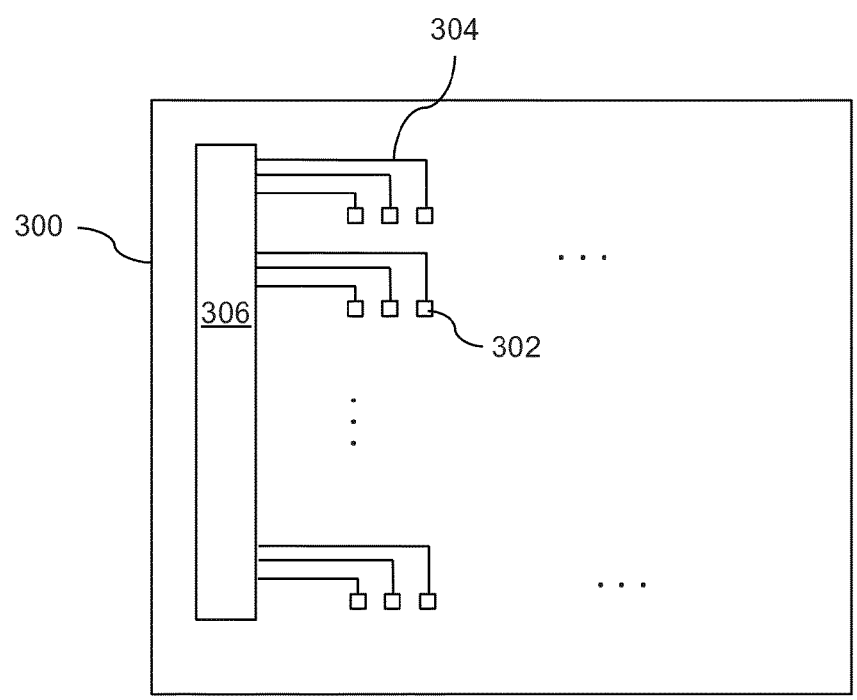
FIGS. 3A-3B depict simplified capacitive fingerprint sensing devices.

Referring now to FIG. 3A, a first simplified capacitive fingerprint sensing device is shown. In the illustrated embodiment, a capacitive sensor can be included in each individual sensing element of a display, thereby combining the display and capacitive sensing functions in each sensing element. For simplicity, only the capacitive sensing function is described herein.

A capacitive sensing device 300 includes a conductive layer patterned into discrete electrodes or plates 302, with each plate connected to a sense line 304. Each discrete plate 302 is included in a sensing element. The sense lines 304 can be connected to sense circuits (not shown) through a sense interface 306. The conductive layer with the discrete plates 302 can be disposed over a common node layer (not shown). The combination of an individual plate 302 and the common node layer forms a capacitive sensor. In another embodiment, the plates 302 can be disposed under the common node layer. Typically, an insulating layer is disposed between the plates 302 and the common node layer.

The capacitive sensors can operate in a self-capacitance mode. For example, with a self-capacitance mode in the FIG. 3A embodiment, the common node layer can be connected to a reference voltage or signal, such as ground. The capacitance of a single plate 302 with respect to ground can be measured. A sense line 304 can be used to measure the capacitance between a plate 302 and the common node layer (e.g., ground).

Figure 3B:
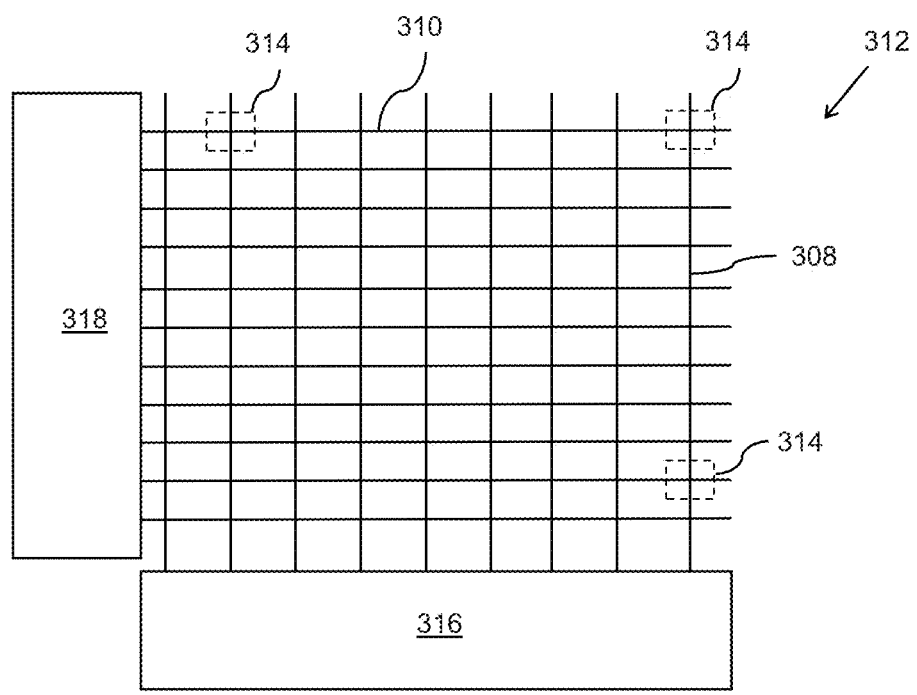

FIG. 3B depicts a second simplified diagram of a capacitive fingerprint sensor. Drive lines 308 and sense lines 310 are arranged to form an array 312. In the illustrated embodiment, the drive lines are vertical lines and the sense lines horizontal lines. Other embodiments can arrange the drive lines as horizontal lines and the sense lines as vertical lines.

A capacitive sensor 314 is formed at each intersection of a drive line and a sense line. The drive lines can be connected to drive circuits (not shown) through a drive interface 316. The drive lines can be driven sequentially or in some other pattern. The sense lines can be connected to sense circuits (not shown) through a sense interface 318. The sense lines can be sensed individually or in groups.

A fingerprint sensing device captures an image of a fingerprint, or a portion of a fingerprint, when a finger or fingers touch an input surface, such as a cover glass of the display 104. The image of the fingerprint can be captured by measuring capacitive changes at one or more capacitive sensors. In other embodiments, the fingerprint sensing device can be a portion of a touchscreen, a trackpad, one or more buttons such as the home button 106, a key or collection of keys on a keyboard, or another input device. The input surface can be a cover glass of a display or an exterior surface of a trackpad, a button, or a key.

Figure 4:
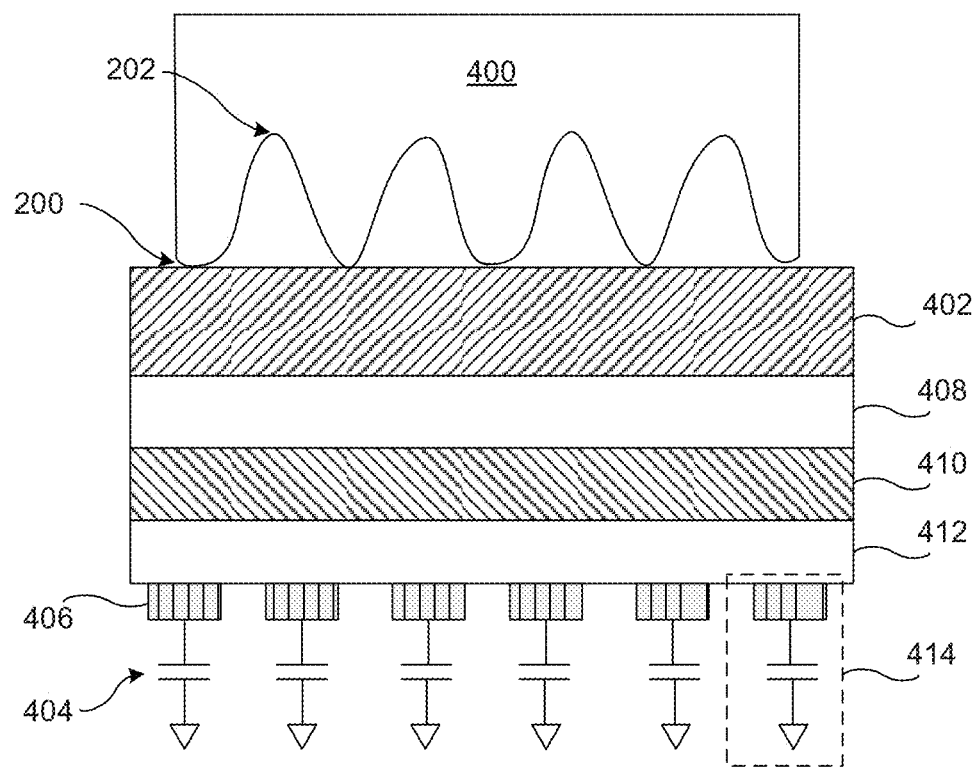
FIG. 4 is an enlarged and simplified cross-section view of a finger on a portion of a capacitive fingerprint sensing device.

FIG. 4 is an enlarged and simplified cross-section view of a finger on a portion of a capacitive fingerprint sensing device. As described earlier, the finger 400 includes a unique pattern of ridges 200 and valleys 202. When the finger 400 touches or applies a force to a surface of an input layer 402, capacitance values (represented by capacitors 404) can be measured between the plates 406 and ground.

In the illustrated embodiment, the input layer 402 is included in a stack of layers. By way of example only, the input surface can be a cover glass of display disposed over an ink layer 408 with an adhesive layer 410 disposed between the ink layer 408 and a passivation layer 412. In some embodiments, sensing through the multiple layers can require a greater gain be applied to the pixel signals produced by the capacitive sensors 414. Noise signals are also amplified by the higher gains, which can render the noise more noticeable and problematic. For example, a signal representing the measured capacitance (without noise) may be only 200 microvolts but when noise is included in the signal, the signal level can increase to 10 millivolts. It can be difficult to distinguish or detect a 200 microvolt signal when the signal of interest is included in a 10 millivolt signal, since 10 millivolts is equal to 10,000 microvolts.

Measurement variations between capacitive sensors are one source of noise in a capacitive sensing device. Plate differences can result in one plate 406 sensing a different capacitance compared to another plate 406. In other words, all things being equal, the plates 406 do not sense the same capacitance. Thus, there can be fixed offsets in the signals produced from the different plates. These fixed offsets, or capacitance variations, can be one source of noise in a capacitance sensing device.

Figure 5:
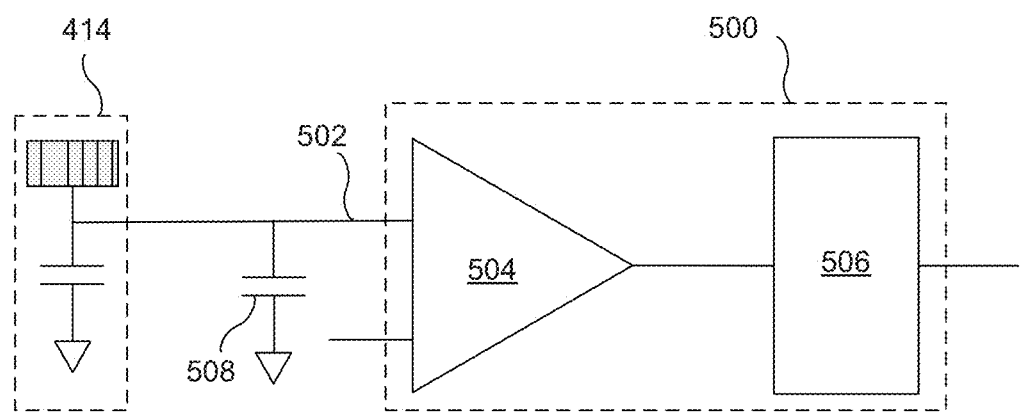
FIG. 5 depicts a capacitive sensor connected to a processing channel.

Another source of noise can result from variations between the gain stages in a processing channel connected to the capacitive sensors. Each signal obtained from a capacitive sensor 414 is input into the processing channel. FIG. 5 depicts a capacitive sensor connected to a processing channel. A signal obtained from the capacitive sensor 414 is input into the processing channel 500 on signal line 502. The processing channel 500 can include one or more amplifiers 504, typically connected in series, and an analog-to-digital converter (ADC) 506. Each amplifier can be a gain stage in the processing channel. An input of the ADC 506 can be connected to an output of the last amplifier in the one or more amplifiers 504. By way of example only, the one or more amplifiers can include four amplifiers connected in series, with a differential amplifier receiving the signal produced by the capacitive sensor 414, followed by an AC amplifier, a correlated-double sampling (CDS) amplifier, and a programmable gain amplifier. Amplifier input capacitance (represented by capacitor 508) can be another source of noise in a capacitive sensing device.

Figure 6:
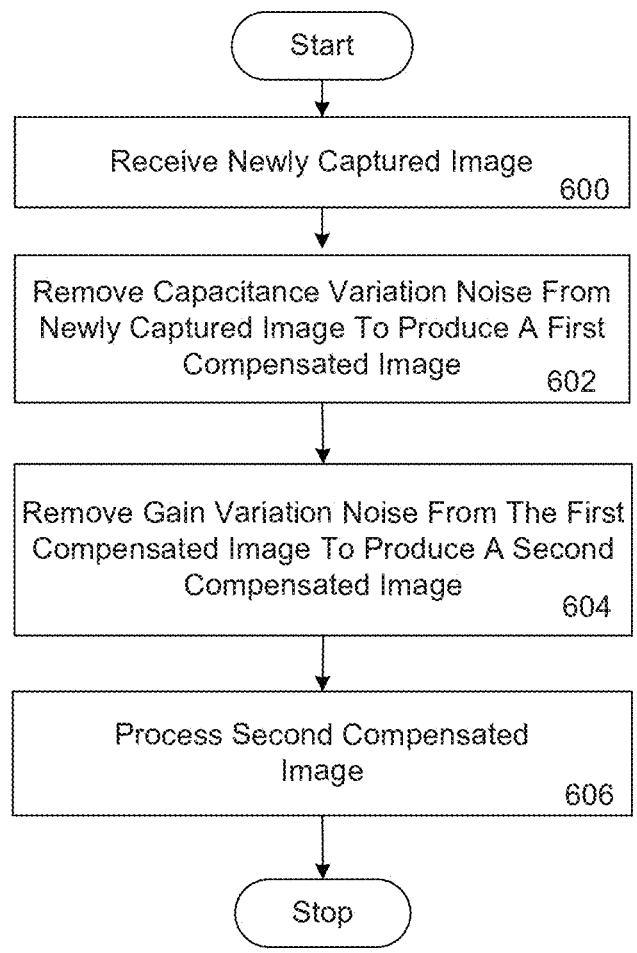
FIG. 6 is a flowchart of an example method for compensating for noise in a capacitive sensing device.

Embodiments described herein compensate for capacitance variations and gain variations in a capacitive sensing device. FIG. 6 is a flowchart of an example method for compensating for noise in a capacitive sensing device. Initially, a new image of a fingerprint is captured by the capacitive sensing device, as shown in block 600. The capacitance variation noise is removed from the newly captured image to produce a first compensated image (block 602). The capacitance variation noise is produced by measurement variations between capacitive sensors.

Next, as shown in block 604, the gain variation noise is removed from the first compensated image to produce a second compensated image. The gain variation noise is produced by the variations between gain elements in a processing channel. The second compensated image is then processed, as shown in block 606. Examples of techniques that can be performed to process the second compensated image include, but are not limited to, image debluring, extraction of the features of the fingerprint, and matching the captured fingerprint image with a reference image.

Figure 7:
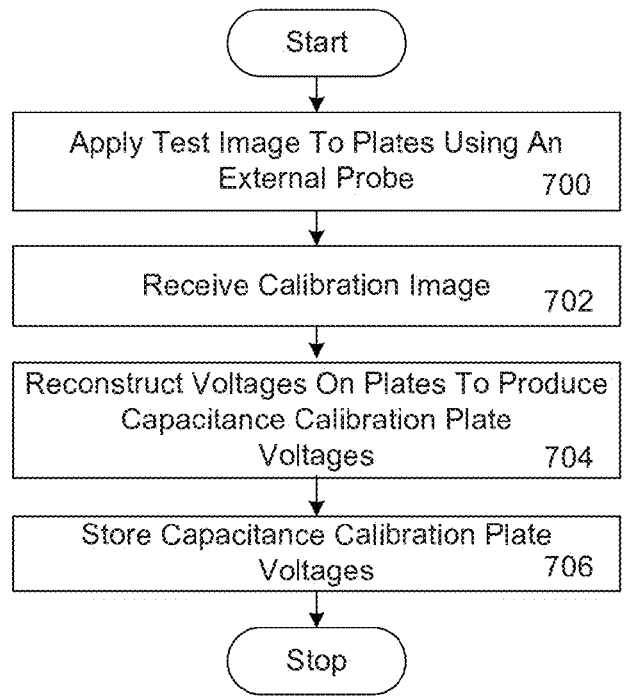
FIG. 7 is a flowchart of a first example method for obtaining calibration data for capacitance variation noise in a capacitive sensing device.

Referring now to FIG. 7, there is shown a first example method for obtaining calibration data for capacitance variation noise in a capacitive sensing device. Initially, at block 700, a test image can be applied to the plates (e.g., plates 406 in FIG. 4) using an external probe. Any suitable image can be used as a test image. For example, in one embodiment, the external probe includes raised lines or ridges arranged in any given pattern to mimic a fingerprint. The test image can be stored in a storage device, such as a read-only memory and a flash memory.

A capacitance calibration image produced by the plates is then received, as shown in block 702. Since the processing channel outputs a digital image in one embodiment, the voltages on the plates during application of the test image are reconstructed to produce capacitance calibration plate voltages (block 804). The capacitance calibration plate voltages can then be stored in a storage device. In one embodiment, the method of FIG. 7 is performed during or immediately after the capacitive sensing device is manufactured and stored in the biometric sensing device, or in an electronic device that includes, or is connected to a biometric sensing device.

Other embodiments can use multiple capacitance calibration images. The capacitance calibration images can be different images (e.g., different image content) and/or images captured with different sensor settings.

Figure 8:
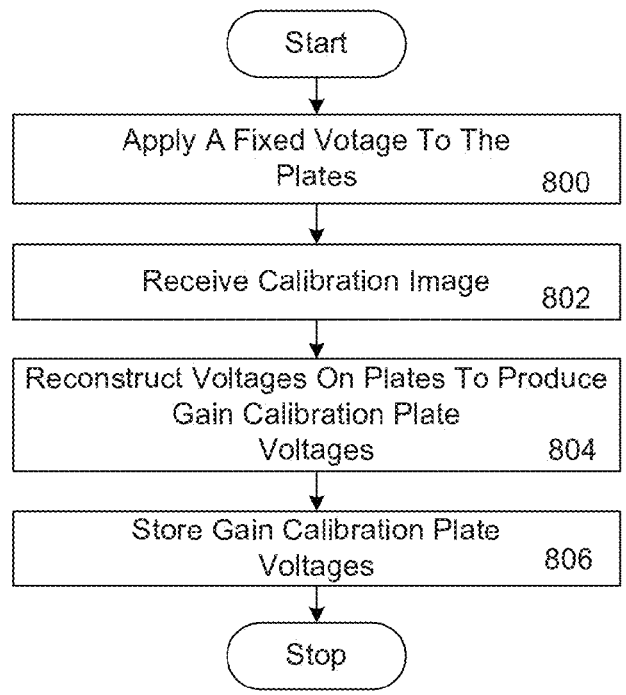
FIG. 8 is a flowchart of an example method for obtaining calibration data for gain variation noise in a capacitive sensing device.

FIG. 8 is a flowchart of an example method for obtaining calibration data for gain variation noise in a capacitive sensing device. Initially, a fixed voltage is applied to the plates (block 800). The fixed voltage can be applied by another external probe. By way of example only, the external probe can include a flat surface that applies the fixed voltage simultaneously to all of the capacitive sensors.

A gain calibration image produced by the plates is then received, as shown in block 802. Since the processing channel outputs a digital image in an embodiment, the voltages that were on the plates during the application of the fixed voltage are reconstructed to produce gain calibration plate voltages (block 804). The gain calibration plate voltages can then be stored in a storage device. Like FIG. 7, the method of FIG. 8 can be performed during or immediately after the capacitive sensing device is manufactured in one embodiment. The gain calibration plate voltages can be stored in the biometric sensing device or in an electronic device that includes or is connected to a biometric sensing device.

Other embodiments can use multiple gain calibration images. Like the capacitance calibration images, the gain calibration images can be different images (e.g., different image content) and/or images captured with different sensor settings.

In the illustrated embodiments, the capacitance calibration data is determined separately from the gain calibration data to separate the noise component that is dependent on temperature. The gain variation noise is dependent on the temperature of the capacitive sensors when the method of FIG. 8 is performed, while the amount of capacitance variation noise is dependent on the signal in the image. As will be described in more detail in conjunction with FIGS. 9-11 and 13-15, there are several different techniques for using or applying the capacitance calibration data and/or the gain calibration data to compensate for signal fixed pattern noise.

Other embodiments do not utilize gain calibration images and/or gain calibration plate voltages. Instead, the compensation for gain variation noise can be performed using known information about the sensors in the biometric device and the signal. For example, the known geometry of sensor-to-channel assignment combined with the assumption that the signal to be reconstructed should be substantially smooth or continuous can be used to perform gain variation noise compensation. The term "gain calibration image" and "gain calibration plate voltages" can therefore include one or more images, plate voltages, and known information about the sensors in the biometric device and the signal.

Figure 9:
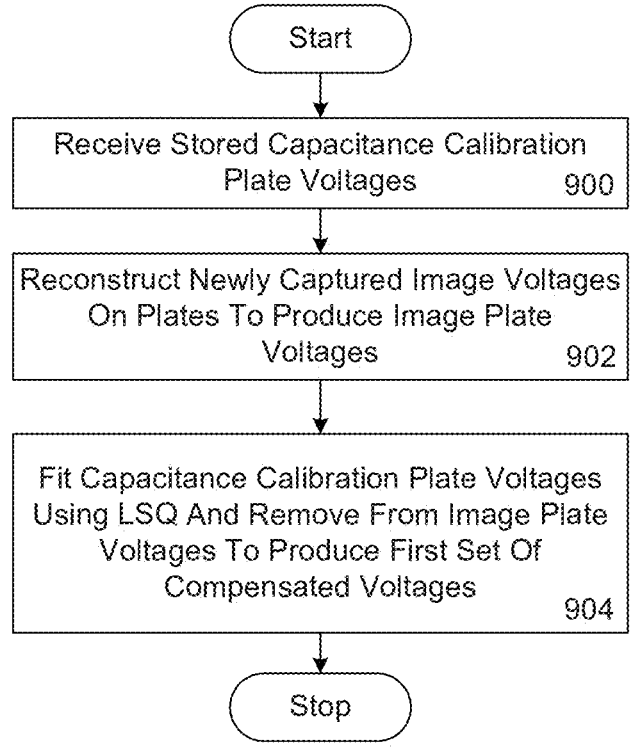
FIG. 9 is a flowchart of an example method for performing block 602 shown in FIG. 6.

Referring now to FIG. 9, there is shown a flowchart of an example method for performing block 602 in FIG. 6. The method of FIG. 9 removes the capacitance variation noise from a newly captured fingerprint image using the capacitance calibration data obtained by the method shown in FIG. 7. In some embodiments, the FIG. 9 method is performed each time a new fingerprint image is captured.

Initially, the capacitance calibration plate voltages that were stored in a storage device at block 706 of FIG. 7 are received at block 900. The voltages that were on the plates when the new image was captured (see block 600 in FIG. 6) are then reconstructed at block 902 to produce image plate voltages. In the illustrated embodiment, the image plate voltages are reconstructed because the original plate voltages were converted to digital signals when processed by a processing channel. Next, as shown in block 904, the capacitance calibration plate voltages are fit into the image plate voltages using, for example, a least squares quadratric (LSQ) fitting process and the capacitance calibration plate voltages are subtracted from the image plate voltages to produce a first set of compensated voltages. Collectively the first set of compensated voltages form the first compensated image.

Figure 10:
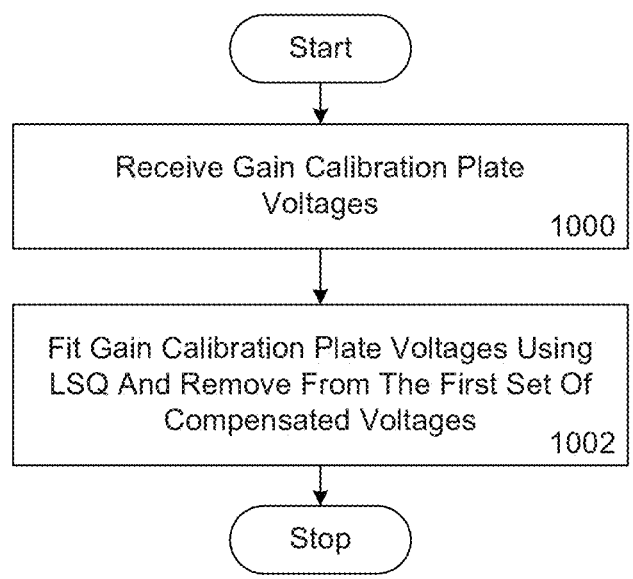
FIG. 10 is a flowchart of an example method for performing block 604 shown in FIG. 6.

FIG. 10 is a flowchart of an example method for performing block 604 in FIG. 6. The method of FIG. 10 removes the gain variation noise from the first compensated image using the gain calibration data obtained by the method shown in FIG. 8. In some embodiments, the method of FIG. 10 can be performed immediately after the performance of the FIG. 9 method.

Initially, the gain calibration plate voltages that were stored in a storage device at block 806 of FIG. 8 are received at block 1000. Next, as shown in block 1002, the gain calibration plate voltages are fit into the first set of compensated voltages using, for example, a LSQ fitting process and the gain calibration plate voltages are subtracted from the first set of compensated voltages to produce a second set of compensated voltages. The second set of compensated voltages collectively forms the second compensated image. And as described in conjunction with FIG. 6, the second compensated image can be further processed at block 606.

Figure 11:
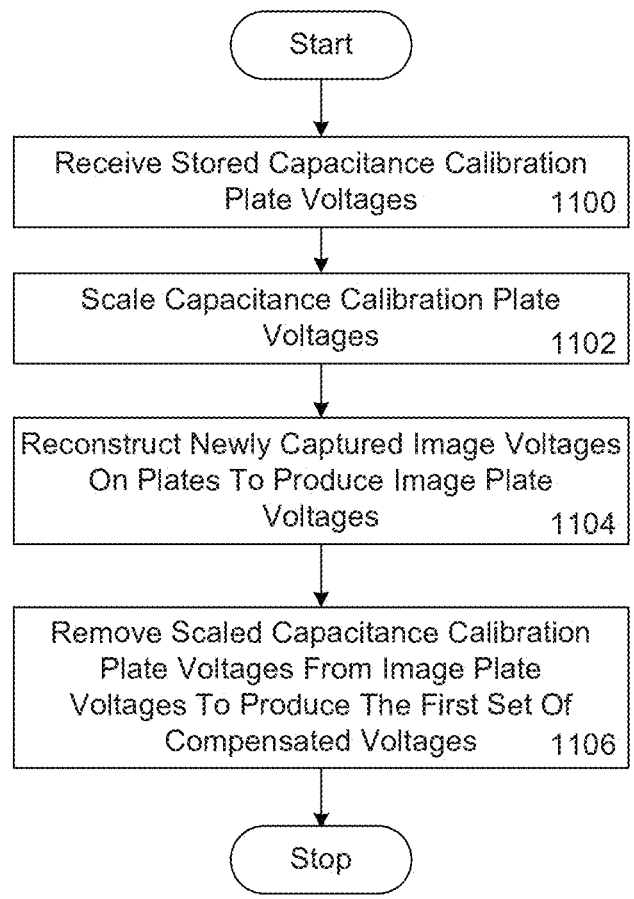
FIG. 11 is a flowchart of another example method for performing block 602 shown in FIG. 6.

Referring now to FIG. 11, there is shown a flowchart of another example method for performing block 602 in FIG. 6. In general, the amount of capacitance variation noise is proportional to the signal. The method of FIG. 11 scales the capacitance calibration data by a ratio of the image noise over the signal noise and then removed from the newly captured image. Like the method of FIG. 9, the method of FIG. 11 can be performed each time a new fingerprint image is captured.

Initially, the capacitance calibration plate voltages that were stored at block 706 of FIG. 7 are received at block 1100. The capacitance calibration plate voltages are then scaled (block 1102). The capacitance calibration plate voltages can be scaled by a ratio of the image signal over the capacitance calibration data signal. The voltages that were on the plates when the new image was captured (see block 600 in FIG. 6) are then reconstructed at block 1104 to produce image plate voltages. Next, at block 1106, the scaled capacitance calibration plate voltages are removed from the image plate voltages to produce a first set of compensated voltages. The gain variation noise can then be removed from the first set of compensated voltages using the method shown in FIG. 10.

Figure 12:
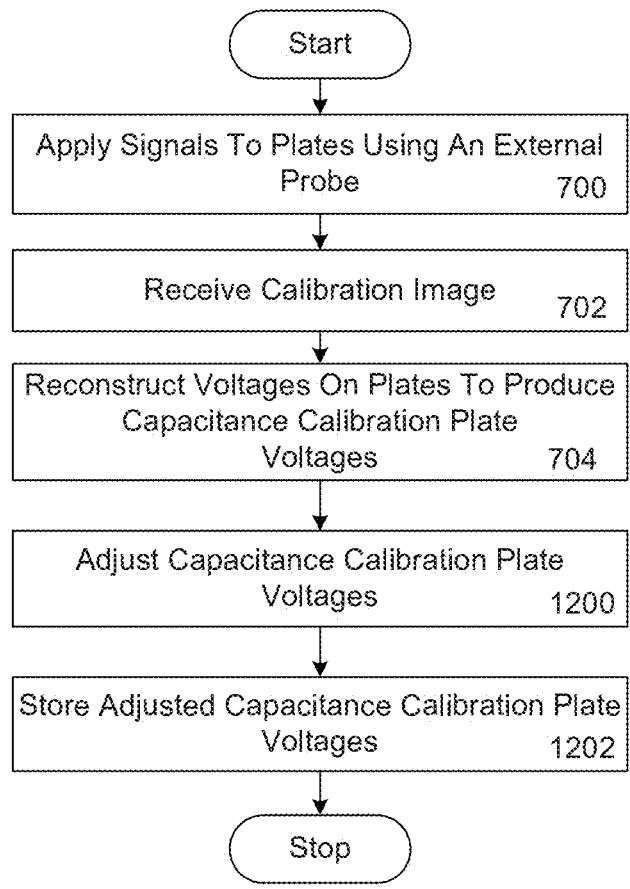
FIG. 12 is a flowchart of a second example method for obtaining calibration data for capacitance variation noise in a capacitive sensing device.

FIG. 12 is a flowchart of a second example method for obtaining calibration data for capacitance variation noise in a capacitive sensing device. The method of FIG. 12 can be performed during or immediately after the manufacture of the fingerprint sensing device and/or the electronic device that includes, or is connected to the fingerprint sensing device.

As described in conjunction with block 600 in FIG. 6, initially a test image can be applied to the plates using an external probe (block 700). A capacitance calibration image produced by the plates is then received, as shown in block 702. The voltages that were on the plates based on the test image can be reconstructed to produce capacitance calibration plate voltages (block 704). The capacitance calibration plate voltages are then adjusted and stored in a storage device (blocks 1200, 1202). The capacitance calibration plate voltages can be adjusted by removing scaled gain variation plate voltages from the capacitance calibration plate voltages. In one embodiment, the capacitance calibration plate voltages (CCPV) are adjusted using the formula $CCPV'(S_1)=CCPV(S_1, T_1)-(S_1/S_2) \times GCPV(S_2, T_1)$, where $S_1$ represents a first signal obtained with the capacitance calibration plate voltages, $T_1$ represents temperature at the time the capacitance and gain calibration data are obtained, GCPV is the gain calibration plate voltages, and $S_2$ represents a second signal obtained with the gain calibration plate voltage. In the illustrated embodiment, the temperature is assumed to be the same at the time the capacitance and gain calibration data are obtained.

Figure 13:
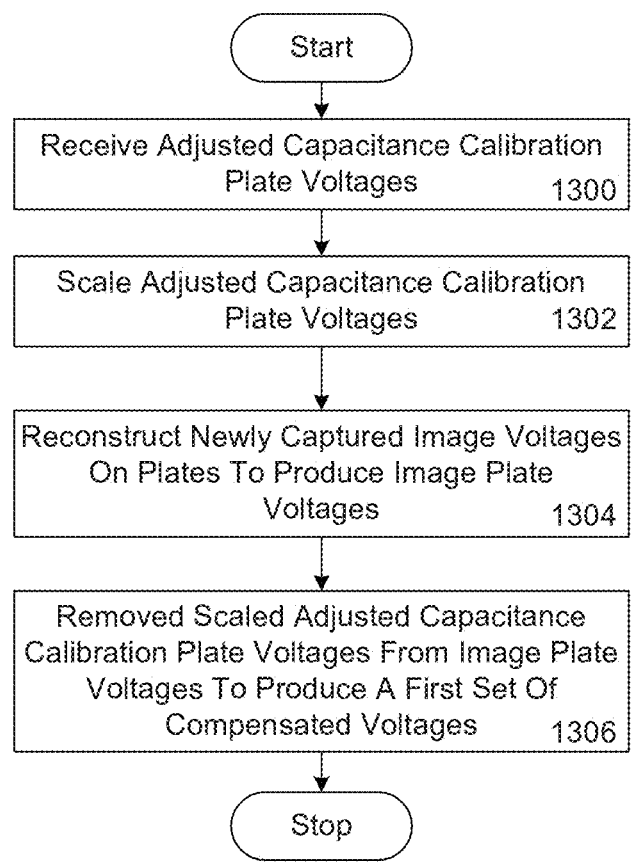
FIG. 13 is a flowchart of a third example method for performing block 602 shown in FIG. 6.
Figure 14:
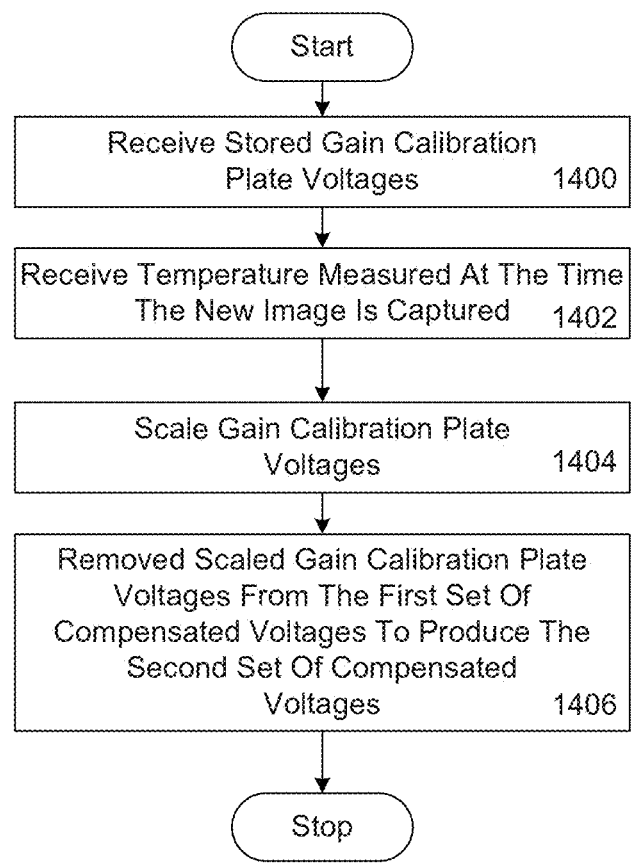
FIG. 14 is a flowchart of an example method for performing block 604 shown in FIG. 6.

Referring now to FIG. 13, there is shown a flowchart of a third example method for performing block 602 shown in FIG. 6. The method of FIG. 13 scales the adjusted capacitance calibration plate voltages (see FIG. 12 method). Initially, the adjusted capacitance calibration plate voltages that were stored in block 1208 of FIG. 12 are received at block 1300. The adjusted capacitance calibration plate voltages are then scaled (block 1302). The adjusted capacitance calibration plate voltages can be scaled by a ratio of the signal in the image over the signal in the capacitance plate voltages. The voltages that were on the plates when the new image was captured (see block 600 in FIG. 6) are then reconstructed at block 1304 to produce image plate voltages. Next, at block 1306, the scaled adjusted capacitance calibration plate voltages are removed from the image plate voltages to produce a first set of compensated voltages.

The gain variation noise can then be removed from the first set of compensated voltages. In one embodiment, the gain variation noise can be removed using the method shown in FIG. 10. In another embodiment, the gain variation noise can be removed using the method illustrated in FIG. 14. A temperature sensor can be included in the fingerprint sensing device or in an electronic device that includes, or is connected to the fingerprint sensing device. The FIG. 14 method scales the gain calibration data based on the temperature of the capacitive sensors at the time a new fingerprint image is captured.

Initially, the gain calibration plate voltages that were stored in block 806 of FIG. 8 are received at block 1400. The temperature as measured by one or more temperature sensors at the time the new fingerprint image is captured is then received, and the gain calibration plate values are scaled (blocks 1402, 1404). In particular, the gain calibration plate voltages can be scaled by a change in temperature between the time the new fingerprint image is captured and the time when the gain calibration plate voltages were obtained. Next, as shown in block 1406, the scaled gain calibration plate voltages are removed from the first set of compensated voltages to produce a second set of compensated voltages. As described earlier, the second set of compensated voltages collectively forms the second compensated image. The second compensated image can be processed further at block 606 (FIG. 6).

Figure 15:
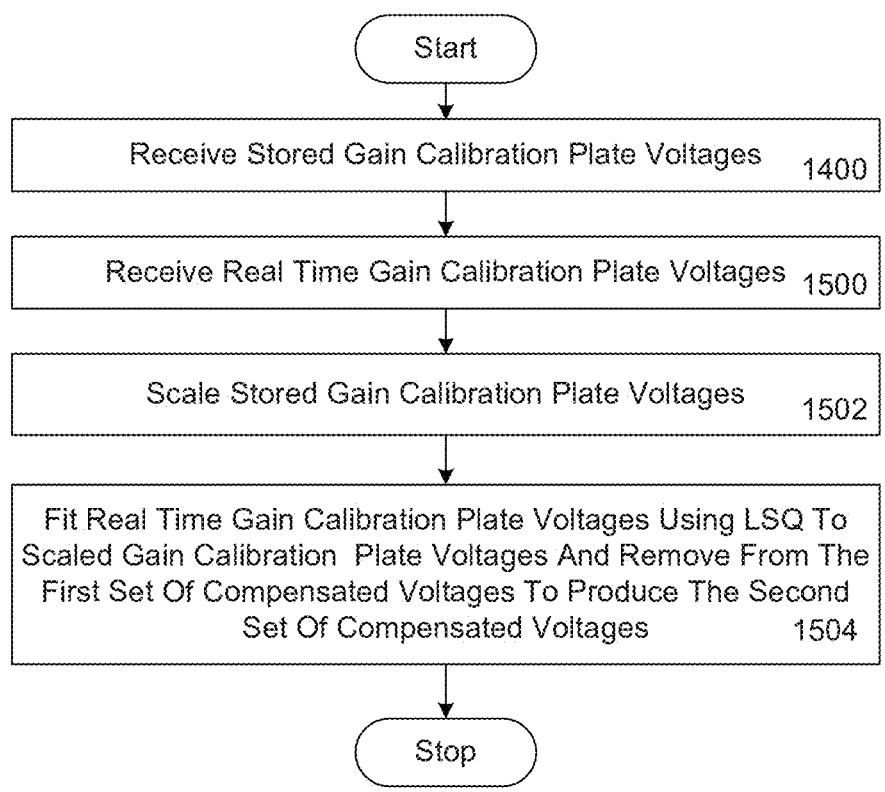
FIG. 15 is a flowchart of another example method for performing block 604 shown in FIG. 6.

Referring now to FIG. 15, there is shown a flowchart of another example method for performing block 604 shown in FIG. 6. Like the FIG. 14 method, the method of FIG. 15 can be performed after block 1306 of FIG. 13. The FIG. 15 method uses dynamic calibration data obtained at the same time, or near the time the new fingerprint image is captured to scale the gain calibration data. This real time calibration data can be used to adjust the gain variation data for temperature changes between the time the new fingerprint image is captured and the time the gain variation data is obtained without the use of a temperature sensor.

Initially, the gain calibration plate voltages that were stored in block 806 of FIG. 8 are received at block 1400. Real time calibration data is then received at block 1500. The real time calibration data can be obtained by receiving a portion of the stored gain calibration plate voltages (or a portion of the gain calibration image) at or near the time the new image is captured. In one embodiment, the real time calibration data is used to determine a scaling factor that can be a ratio of the real time gain calibration plate voltages over the gain calibration plate voltages.

The gain calibration plate voltages are then scaled at block 1502 by a ratio of the signals in the image over the signals in the capacitance plate voltages and by a change in temperature between the time the newly captured image is obtained and the time when the gain calibration plate voltages were obtained. The real time gain calibration plate voltages are then fitted into the scaled gain calibration plate voltages and removed from the first set of compensated voltages to produce a second set of compensated voltages. As described earlier, the second set of compensated voltages collectively forms the second compensated image. The second compensated image can be processed further at block 606 (FIG. 6).

Figure 16:
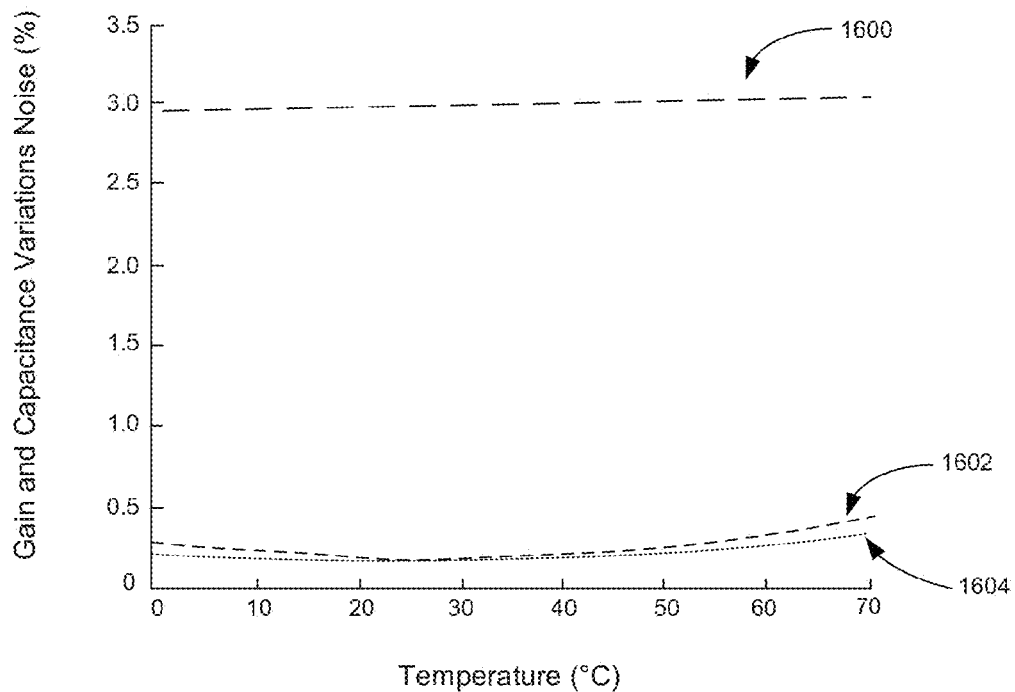
FIG. 16 is a graph illustrating amounts of noise before and after compensating for capacitance and gain variations in a capacitance sensing device.

Referring now to FIG. 16, there is shown a graph illustrating amounts of noise before and after compensating for capacitance and gain variations in a capacitance sensing device. Plot 1600 represents the amount of signal fixed pattern noise in a fingerprint image. In the illustrated embodiment, the amount of signal fixed pattern noise is approximately three percent.

Plot 1602 depicts the amount of signal fixed pattern noise after the fingerprint image has been compensated for capacitance variation noise using the method shown in FIG. 9. As described previously, capacitance variation noise is one component of the signal fixed pattern noise. As shown, the amount of signal fixed pattern noise decreases to approximately 0.3 percent.

Plot 1604 illustrates the amount of signal fixed pattern noise after the fingerprint image has been compensated for gain variation noise (another component of signal fixed pattern noise) using the method of FIG. 10. As shown, the amount of signal fixed pattern noise decreases further to approximately 0.2 percent. Thus, the signal fixed pattern noise compensation disclosed herein can significantly reduce the amount of signal fixed pattern noise in an image or image signals.

Figure 17:
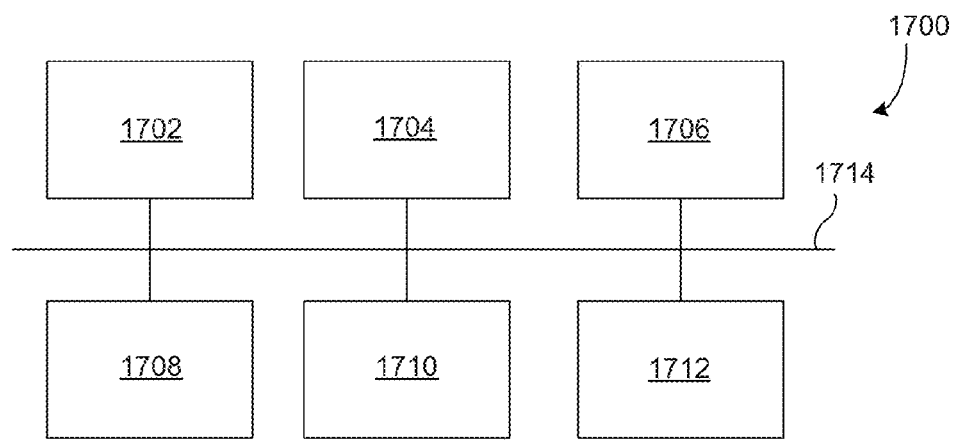
FIG. 17 is a simplified block diagram of an electronic device that includes a biometric sensing device.

FIG. 17 is a simplified block diagram of an electronic device 1700 that includes a biometric sensing device. A processing device 1702 can be communicatively connected to a biometric sensing device 1704, a storage device 1706, a display 1708, an input/output (I/O) device 1710, and one or more temperature sensors 1712 using bus 1714. The biometric sensing device 1704 can be implemented as a capacitive fingerprint sensing device in one embodiment. Other embodiments can configure the biometric sensing device differently, such as with a different type of fingerprint sensor, or with a different type of a biometric scanning device (e.g., an iris scanner), or as a combination of different types of biometric sensing devices.

The processing device 1702 can be implemented as one or more processing devices. The processing device 1702 can be adapted to perform the methods shown in FIGS. 6 through 15. Any suitable type of processing device can be used for the one or more processing devices. By way of example only, the one or more processing devices can be implemented as a microprocessor, an application-specific integrated circuit (ASIC), or a digital signal processor, either individually or in various combinations. The one or more processors can be constructed with the biometric sensing device 1704, or separate from the biometric sensing device but in, or connected to the electronic device.

The storage device 1706 can be implemented as one or more memory devices. The storage device can store the capacitance calibration data, the gain calibration data, a test image used in the method of FIGS. 7 and 12, and/or the fixed voltage level applied in the method of FIG. 8. Any suitable type of memory can be used. By way of example only, the one or more memory devices can be implemented with volatile or non-volatile memory, such as a read-only memory, a dynamic RAM, or a flash memory, either individually or in various combinations.

The display 1708 can be used to provide a visual output to a user and to allow the user to interact with the electronic device. Any suitable type of display can be used, including, but not limited to, a touchscreen display that includes a liquid crystal display (LCD) or an organic light-emitting display (OLED).

The I/O device 1710 can be configured as one or more different types of I/O devices. For example, the I/O device can include a network device for connecting to a wired or wireless network such as a computing network (e.g. Internet) or a cellular network, a button such as button 106 in FIG. 1, a microphone, and one or more speakers.

Various embodiments have been described in detail with particular reference to certain features thereof, but it will be understood that variations and modifications can be effected within the spirit and scope of the disclosure. For example, instead of compensating for both noise components, other embodiments can compensate for only one noise component using techniques disclosed herein. Additionally or alternatively, different types of sensing technologies that are subject to signal measurement variation noise and/or gain variation noise can compensate for signal measurement variation noise and gain variation noise using the techniques disclosed herein.

Even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. A method for compensating for signal fixed pattern noise in an image captured by a biometric sensing device, the method comprising:
   receiving a signal measurement calibration image from sensors in the biometric sensing device based on an application of a test image to the sensors;
   reconstructing voltages on the sensors based on the signal measurement calibration image to produce signal measurement calibration sensor voltages;
   receiving the captured image; and
   removing the signal measurement calibration sensor voltages from the captured image by:
     reconstructing voltages on the sensors based on the captured image to produce image sensor voltages; and producing a first set of compensated voltages by:
fitting the signal measurement calibration sensor voltages into the image sensor voltages using a least squares fitting process; and
removing the signal measurement calibration sensor voltages from the image sensor voltages.

2. The method as in claim 1, further comprising:
receiving a gain calibration image from sensors in the biometric sensing device based on an application of a fixed voltage to the sensors;
reconstructing voltages on the sensors based on the gain calibration image to produce gain calibration sensor voltages; and
removing the gain calibration sensor voltages from the first set of compensated voltages to produce a second set of compensated voltages.

3. The method as in claim 2, further comprising processing the second set of compensated voltages to produce a final image.

4. The method as in claim 2, further comprising storing the gain calibration sensor voltages.

5. The method as in claim 2, wherein removing the gain calibration sensor voltages from the first set of compensated voltages comprises producing the second set of compensated voltages by fitting the gain calibration sensor voltages into the first set of compensated voltages using a least squared fitting process and removing the gain calibration sensor voltages from the first set of compensated voltages.

6. The method as in claim 2, further comprising adjusting the signal measurement calibration sensor voltages by removing scaled gain calibration sensor voltages from the signal measurement calibration sensor voltages.

7. The method as in claim 6, wherein removing the gain calibration sensor voltages from the first set of compensated voltages comprises:
receiving a temperature measurement obtained at or near a time when the captured image is captured;
scaling the gain calibration sensor voltages based on the temperature measurement and a ratio of a signal in the captured image over a signal in the gain calibration image; and
producing the second set of compensated voltages by removing the scaled gain calibration sensor voltages from the first set of compensated voltages.

8. The method as in claim 6, wherein removing the gain calibration sensor voltages from the first set of compensated voltages comprises:
receiving real time calibration data obtained at or near a time when the captured image is captured;
scaling the gain calibration sensor voltages based on a ratio of the real time calibration data over the gain calibration sensor voltages; and
producing the second set of compensated voltages by:
fitting the scaled gain calibration sensor voltages in first set of compensated voltages using a least squares fitting process; and
removing the scaled gain calibration sensor voltages from the first set of compensated voltages.

9. The method as in claim 1, further comprising storing the signal measurement calibration sensor voltages.

10. The method as in claim 1, wherein the biometric sensing device comprises a capacitive fingerprint sensing device and the signal measurement calibration sensor voltages comprise variations in capacitance measurements.

11. A method for compensating for signal fixed pattern noise in an image captured by a biometric sensing device, the method comprising:

receiving a gain calibration image from sensors in the biometric sensing device based on an application of a fixed voltage to the sensors;
reconstructing voltages on the sensors based on the gain calibration image to produce gain calibration sensor voltages; and
removing the gain calibration sensor voltages from the captured image by:
scaling the gain calibration sensor voltages based on a ratio of a signal in the captured image over a signal in the gain calibration image;
reconstructing voltages on the sensors based on the captured image to produce image sensor voltages; and
producing a first set of compensated voltages by removing the scaled gain calibration sensor voltages from the image sensor voltages.

12. The method as in claim 11, further comprising:
receiving a signal measurement calibration image from sensors in the biometric sensing device based on an application of a test image to the sensors;
reconstructing voltages on the sensors based on the signal measurement calibration image to produce signal measurement calibration sensor voltages; and
removing the signal measurement calibration sensor voltages from the first set of compensated voltages to produce a second set of compensated voltages.

13. The method as in claim 12, further comprising processing the second set of compensated voltages to produce a final image.

14. An electronic device, comprising:
a biometric sensing device comprising a plurality of sensors connected to a processing channel that includes at least one amplifier having a gain, wherein an image captured by the biometric sensing device is processed by the processing channel; and
one or more processing devices operatively connected to the processing channel and adapted to compensate for signal fixed pattern noise in an image captured by the biometric sensing device by:
receiving a signal measurement calibration image from sensors in the biometric sensing device;
reconstructing voltages on the sensors based on the signal measurement calibration image to produce signal measurement calibration sensor voltages; and
removing the signal measurement calibration sensor voltages from the captured image by:
scaling the signal measurement calibration sensor voltages based on a ratio of a signal in the captured image over a signal in the signal measurement calibration image;
reconstructing voltages on the sensors based on the captured image to produce image sensor voltages; and
producing a first set of compensated voltages by removing the scaled signal measurement calibration sensor voltages from the image sensor voltages.

15. The electronic device as in claim 14, wherein the one or more processing devices is further adapted to:
receive a gain calibration image from sensors in the biometric sensing device;
reconstruct voltages on the sensors based on the gain calibration image to produce gain calibration sensor voltages; and remove the gain calibration sensor voltages from the first set of compensated voltages to produce a second set of compensated voltages.

16. The electronic device as in claim 15, further comprising one or more storage devices for storing at least one of a test image, first calibration data for the signal measurement calibration sensor voltages, and second calibration data for the gain calibration sensor voltages.

17. The electronic device as in claim 14, further comprising one or more temperature sensors.

18. The electronic device as in claim 14, wherein the biometric sensing device comprises a capacitive fingerprint sensing device, and the signal measurement calibration sensor voltages comprise variations in capacitance measurements.

19. An electronic device, comprising:
a biometric sensing device comprising a plurality of sensors connected to a processing channel that includes at least one amplifier having a gain, wherein an image captured by the biometric sensing device is processed by the processing channel; and
one or more processing devices operatively connected to the processing channel and adapted to compensate for signal fixed pattern noise in an image captured by the biometric sensing device by:
receiving a gain calibration image from sensors in the biometric sensing device;
reconstructing voltages on the sensors based on the gain calibration image to produce gain calibration sensor voltages; and
removing the gain calibration sensor voltages from the captured by:
reconstructing voltages on the sensors based on the captured image to produce image sensor voltages; and
producing a first set of compensated voltages by:
fitting the gain calibration sensor voltages into the image sensor voltages using a least squared fitting process; and
removing the gain calibration sensor voltages from the image sensor voltages.

20. The electronic device as in claim 19, wherein the one or more processing devices is further adapted to:
receive a signal measurement calibration image from sensors in the biometric sensing device;
reconstruct voltages on the sensors based on the signal measurement calibration image to produce signal measurement calibration sensor voltages; and
remove the signal measurement calibration sensor voltages from the first set of compensated voltages to produce a second set of compensated voltages.

* * * * *